(12) United States Patent
Busch

(10) Patent No.: US 6,343,829 B2
(45) Date of Patent: Feb. 5, 2002

(54) FOLDING TOP FOR A MOTOR VEHICLE

(75) Inventor: Peter Busch, Mengkofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/791,752

(22) Filed: Feb. 26, 2001

(30) Foreign Application Priority Data

Feb. 24, 2000 (DE) .......................................... 100 08 492

(51) Int. Cl.[7] .................................................. B60J 7/12
(52) U.S. Cl. .............................. 296/107.15; 296/107.16
(58) Field of Search .............................. 296/108, 109, 296/114, 107.09, 107.15, 107.16, 107.17

(56) References Cited

U.S. PATENT DOCUMENTS

| | | | |
|---|---|---|---|
| 5,979,970 A | * 11/1999 | Rothe et al. | 296/107.17 |
| 6,139,087 A | * 10/2000 | Wolfmaier et al. | 296/107.16 |

FOREIGN PATENT DOCUMENTS

| | | |
|---|---|---|
| DE | 196 13 346 | 10/1997 |
| DE | 197 41 264 | 3/1999 |
| DE | 198 01 876 | 7/1999 |
| JP | 2-306822 A | * 12/1990 .................. 296/108 |

* cited by examiner

Primary Examiner—Joseph D. Pape
Assistant Examiner—Jason Morrow
(74) Attorney, Agent, or Firm—Crowell & Moring LLP

(57) ABSTRACT

Folding top for a motor vehicle with a folding top frame, which exhibits on the side a front, center and rear frame part, of which the center frame part can be adjusted by a four-membered joint, where a lever is formed by the rear frame part. The front frame part can be adjusted with respect to the center frame part by three guides, of which in a swivel joint the first and second guides can be swivelled in succession around a motor vehicle cross axis and are hinged to the front frame part. On the other hand, the first guide is hinged to the center frame part. The third guide can be swivelled around a motor vehicle cross axis in a swivel joint and is hinged to the rear frame part and, on the other hand, is hinged to the first guide. The second guide can be swivelled around a motor vehicle cross axis in a swivel joint and is hinged to the third guide.

30 Claims, 1 Drawing Sheet

FOLDING TOP FOR A MOTOR VEHICLE

This application claims the priority of German Application No. DE 100 08 492.3, filed in Germany on Feb. 24, 2000, the disclosure of which is expressly incorporated by reference herein.

BACKGROUND AND SUMMARY OF THE INVENTION

This invention relates to a folding top for a motor vehicle with a folding top frame, which exhibits on the side a front, center and rear frame part, of which the center frame part can be adjusted by means of a four-membered joint, where a lever is formed by means of the rear frame part, and the front frame part can be adjusted with respect to the center frame part by means of three guides, of which in a swivel joint the first and second guides can be swivelled in succession around a motor vehicle cross axis and are hinged to the front frame part, and the first guide is hinged to the center frame part.

In German Patent Document DE 196 13 356 C2 such a folding top exhibits a folding top rod linkage with a side frame, comprising three parts. The front side frame part is connected to the center side frame part by a parallelogram guide arrangement. To control the movement of the front side frame part with respect to the center side frame part when opening and closing the folding top, the rear guide of the parallelogram guide arrangement has a connecting guide, with which a guide pin on one end of a dual armed lever can engage adjustably and whose other region forms a lever of a four-membered joint to guide the center side frame part. The connecting guide weakens the rear guide, which can deform especially in the case of a folding top that is difficult to adjust, if it is not dimensioned correspondingly larger or is produced with higher stability. In the case of a folding top that is symmetrical in the cross direction of the motor vehicle, the pins, which are located on the opposite sides and engage with an assigned connecting guide, do not contribute or hardly contribute to the stability of the folding top. If the folding top is unevenly loaded, for example, when opening or closing, the pins can move at least somewhat differently in the connecting guides, a state that makes it difficult or impossible to adjust the folding top.

An object of the invention is to provide a folding top for a motor vehicle with the features mentioned above where the folding top exhibits a simpler construction and greater stability.

This object is achieved according to preferred embodiments of the invention in that the third guide can be swivelled around a motor vehicle cross axis in a swivel joint and is hinged to the rear frame part and to the first guide; and the second guide can be swivelled around a motor vehicle cross axis in a swivel joint and is hinged to the third guide.

The guides and levers, provided to displace the side frame parts, are connected to the parts in question exclusively by swivel joints that are inexpensive to produce. The swivel joints permit only a swivel movement of the parts in questions around a motor vehicle cross axis and thus stabilize the folding top in every position of adjustment during the opening and closing operation. Thus, the folding top can be opened and closed more uniformly and with a smaller amount of force manually or with a motor. If the front frame part forms a front bow and the center frame part forms a main bow, these bows can extend in the longitudinal direction of the motor vehicle over a length of, for example, several decimeters, since the bows, arranged in succession in the closing position of the folding top, are displaced in such a manner, for example, in their side regions that in opening and closing the folding top, they are not in the adjusting region of the respective other part or another part of the folding top. In the maximum open position of the folding top, the front and center side frame parts or the front bow and the main bow are disposed compactly so as to be curved one over the other in the same direction. Preferably, the front bow or the rear bow, exhibiting a larger longitudinal stretch in the longitudinal direction of the motor vehicle, can cover in such a manner partially or totally the other parts of the folding top in the maximum open position. Thus, there is no need for a canvas or folding top compartment cover, provided in other motor vehicles to cover the opened folding top.

Other objects, advantages and novel features of the present invention will become apparent from the following detailed description of the invention when considered in conjunction with the accompanying drawings.

DETAILED DESCRIPTION OF THE DRAWINGS

Figure 1:
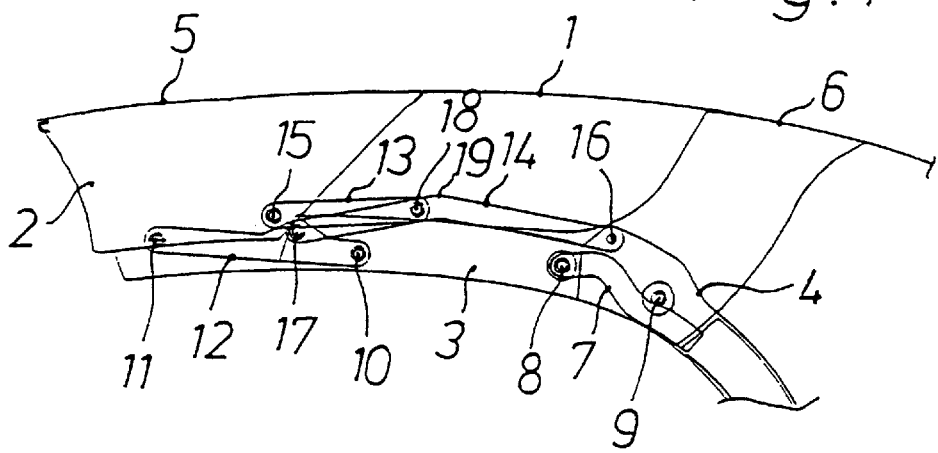
FIG. 1 is a simplified side view of the closed folding top.

The folding top of a motor vehicle, whose roof parts are depicted as a simplified side view in FIG. 1, exhibits a folding top material 1, which is carried or supported by a folding top frame. The folding top frame is constructed symmetrically with respect to a vertical center plane of the motor vehicle and exhibits on each of its sides a front frame part 2, a center frame part 3 and a rear frame part 4, which in the illustrated closing position of the folding top are arranged approximately flush in succession. The two front frame parts 2, which are located on opposite sides, are connected together, forming a front bow 5. The two center frame parts 3, which are located on opposite sides, constitute the side regions of a main bow 6, which extends, like the front bow 5, over the entire width of the roof of the folding top, which supports from below the folding top material 1. The center frame part 3 can be adjusted by a four-membered joint, where a lever is formed by the rear frame part 4. The other lever of the four-membered joint forms a main guide 7, which is hinged to the center frame part 3 so as to swivel around a motor vehicle cross axis 8 in a swivel joint. The rear frame part 4 forms a main column, which is hinged to the center frame part 3 so as to swivel around a cross axis 9 of the motor vehicle in a swivel joint.

In the illustrated closing position the motor vehicle cross axis 8 is located in front of and somewhat over the motor vehicle cross axis 9. The rear frame part 4 and the main guide 7 are braced on their rear bottom end (not illustrated) against a main bearing block so as to swivel around a motor vehicle cross axis. Said main bearing block is fastened, for example, detachably, to the motor vehicle chassis.

Between the front frame part 2 and the center frame part 3 there is a first guide 12, which is connected, on the one hand, to the center frame part 3 and, on the other hand, to the front frame part 2 so as to articulate in a swivel joint around a motor vehicle cross axis 10, 11.

Behind the first guide 12 there is a second guide 13, which is connected to the front frame part 2 so as to swivel around a motor vehicle cross axis 15 in a swivel joint behind the motor vehicle cross axis 11. A third guide 14, which is approximately horizontal in all adjustment positions of the folding top, engages with the rear frame part 4 so as to swivel around a motor vehicle cross axis 16 in a swivel joint.

In the illustrated closing position of the folding top, the motor vehicle cross axis 16 is disposed in the motor vehicle longitudinal direction approximately between the two motor vehicles cross axes 8 and 9 and a little above. On its front region, the third guide 14 engages, for example, approximately in a central region of the first guide 12 between the motor vehicle cross axes 10, 11, so as to swivel around a motor vehicle cross axis 17 in a swivel joint.

The rear end of the second guide 13, located in the closing position of the folding top, engages with the third guide 14 in a central longitudinal region so as to swivel around a motor vehicle cross axis 18 in a swivel joint. In the closing position of the folding top, the first guide 12 is tilted somewhat at the top toward the front, and the second guide is tilted somewhat at the bottom toward the front from a horizontal position. The third guide 14 exhibits in its central longitudinal region a bend 19, from which in the closing position of the folding top the third guide 14 extends in an approximately straight line, on the one hand, toward the front and, on the other hand, to the rear and somewhat toward the bottom.

Figure 2:
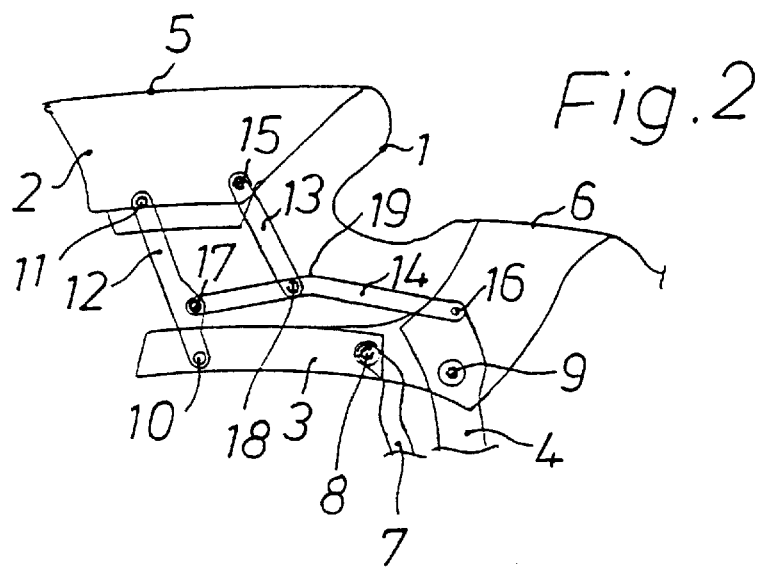
FIG. 2 is a view, corresponding to FIG. 1, of the partially opened folding top.

FIG. 2 depicts the folding top partially open. In this view the side frame parts 2, 3, 4 and the side guides 12, 13, 14 and the main guide 7 are very easy to recognize. The first and second guides 12, 13 are located in each position of the folding top in an approximately parallel position. The main guide 7, forming a lever of a four-membered joint, is arranged in front of the rear frame part 4 when the folding top is somewhat open. Said rear frame part 4 forms the main column of the folding top.

Figure 3:
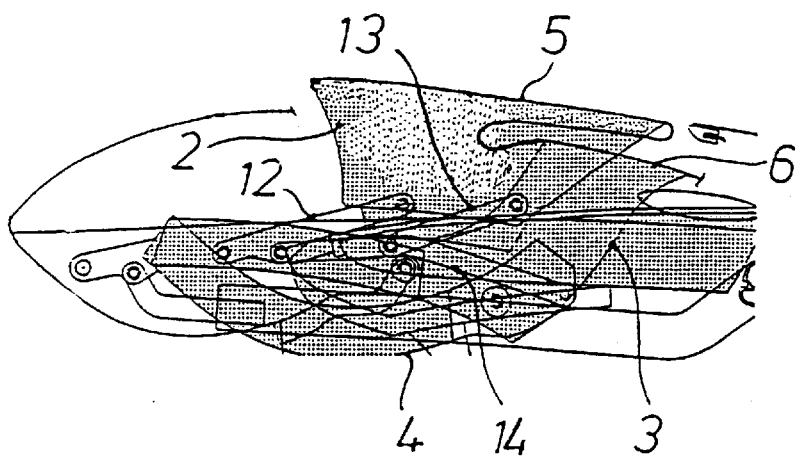
FIG. 3 is a view, corresponding to the previous figures, of the folding top, deposited in a rear receiving compartment.

FIG. 3 depicts the folding top in its maximum open position, in which the folding top is put into a rear receiving compartment. When the folding top is open, the front bow 5 and the main bow 6 are adjusted in such a manner without any essential swivel movement around a motor vehicle cross axis that in the maximum open position of the folding top the front bow 5 is located over the main bow 6 so as to save space. In the motor vehicle cross direction the front bow and/or the main bow can be curved. So that the main bow 6, the main guide 7 and the third frame part 4, forming a main column, are not located in the adjusting region of an adjacent part when opening and closing the folding top, the main bow 6 is disposed on the side internally; the main guide 7, on the side in the center; and the rear frame part 4, forming the main column, on the side externally.

The dimensions and the shape of the parts used in the folding top can also deviate from the embodiment. The folding top was described with reference to a folding top frame, supporting a folding top material. It is also conceivable that especially the frame parts can be designed in such a manner that without a folding top material they can form a folding top, designed as a folding roof. It is also possible that, for example, the front and center frame parts form a solid roof member, to which adjoins only in the rear a folding top material, supported by a rear folding top frame.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Folding top for a motor vehicle, comprising a folding top frame, which exhibits on a side, a front, center and rear frame part, of which the center frame part can be adjusted by a four-membered joint, where a lever is formed by the rear frame part, and the front frame part can be adjusted with respect to the center frame part by three guides, of which in respective first and second swivel joints a first and a second guide can be swivelled in succession around a motor vehicle cross axis and are hinged to the front frame part and the first guide is hinged to the center frame part, wherein a third guide can be swivelled around the motor vehicle cross axis in a third swivel joint and is hinged to the rear frame part and to the first guide, and the second guide can be swivelled around the motor vehicle cross axis in the second swivel joint and is hinged to the third guide.

2. The folding top according to claim 1, wherein the third guide is hinged to the first guide approximately in a central longitudinal region of the first guide.

3. The folding top according to claim 1, wherein the second guide is hinged to the third guide approximately in a central longitudinal region of the third guide.

4. The folding top according to claim 2, wherein the second guide is hinged to the third guide approximately in a central longitudinal region of the third guide.

5. The folding top according to claim 1, wherein the swivel joint is located between the third guide and the rear frame part in a closing position of the folding top in front of and over the swivel joint between the rear frame part and the center frame part.

6. The folding top according to claim 4, wherein the third swivel joint between the third guide and the rear frame part is located, in the closing position of the folding top, in front of and over a swivel joint between the rear frame part and the center frame part.

7. The folding top according to claim 1, wherein in the closing position of the folding top the first guide tilts upward toward the front and the second guide tilts downward toward the front.

8. The folding top according to claim 4, wherein in the closing position of the folding top the first guide tilts upward toward the front and the second guide tilts downward toward the front.

9. The folding top according to claim 5, wherein in the closing position of the folding top the first guide tilts upward toward the front and the second guide tilts downward toward the front.

10. The folding top according to claim 1, wherein in all positions of the folding top the third guide is in an approximately horizontal position.

11. The folding top according to claim 4, wherein in all positions of the folding top the third guide is in an approximately horizontal position.

12. The folding top according to claim 5, wherein in all positions of the folding top the third guide is in an approximately horizontal position.

13. The folding top according to claim 7, wherein in all positions of the folding top the third guide is in an approximately horizontal position.

14. The folding top according to claim 1, wherein the third guide exhibits in a central longitudinal region a bend, from which in the closing position of the folding top the third guide angles downward toward the front and downward to the rear.

15. The folding top according to claim 4, wherein the third guide exhibits in a central longitudinal region a bend, from which in the closing position of the folding top the third guide angles downward toward the front and downward to the rear.

16. The folding top according to claim 13, wherein the third guide exhibits in a central longitudinal region a bend, from which in the closing position of the folding top the third guide angles downward toward the front and downward to the rear.

17. The folding top according to claim 1, wherein the front frame part forms a side region of a front bow and the center frame part forms a side region of a main bow, whereby the front bow and the main bow extend over the entire roof width of the folding top.

18. The folding top according to claim 9, wherein the front frame part forms a side region of a front bow and the center frame part forms a side region of a main bow, whereby the front bow and the main bow extend over the entire roof width of the folding top.

19. The folding top according to claim 16, wherein the front frame part forms a side region of a front bow and the center frame part forms a side region of a main bow, whereby the front bow and the main bow extend over the entire roof width of the folding top.

20. The folding top according to claim 1, wherein the first and second guides are in an approximately parallel position in every position of the folding top.

21. The folding top according to claim 11, wherein the first and second guides are in an approximately parallel position in every position of the folding top.

22. The folding top according to claim 19, wherein the first and second guides are in an approximately parallel position in every position of the folding top.

23. The folding top according to claim 1, wherein the rear frame part is a main column and the second lever of the four-membered joint is a main guide, whereby, when the folding top is partially or totally opened, the main guide is hinged to the center frame part in front of the rear frame part, forming a main column.

24. The folding top according to claim 16, wherein the rear frame part is a main column and the second lever of the four-membered joint is a main guide, whereby, when the folding top is partially or totally opened, the main guide is hinged to the center frame part in front of the rear frame part, forming a main column.

25. The folding top according to claim 22, wherein the rear frame part is a main column and the second lever of the four-membered joint is a main guide, whereby, when the folding top is partially or totally opened, the main guide is hinged to the center frame part in front of the rear frame part, forming a main column.

26. The folding top according to claim 17, wherein, when the folding top is open, the front bow and the main bow are adjusted in such a manner without substantial swivel movement around a motor vehicle cross axis that in the maximum open position of the folding top the front bow is located at least partially over the main bow in a rear receiving space and covers at least partially the parts of the folding top.

27. The folding top according to claim 21, wherein, when the folding top is open, a front bow and a main bow are adjusted in such a manner without substantial swivel movement around a motor vehicle cross axis that in the maximum open position of the folding top the front bow is located at least partially over the main bow in a rear receiving space and covers at least partially the parts of the folding top.

28. The folding top according to claim 25, wherein, when the folding top is open, the front bow and the main bow are adjusted in such a manner without swivel movement around a motor vehicle cross axis that in the maximum open position of the folding top the front bow is located at least partially over the main bow in a rear receiving space and covers at least partially the parts of the folding top.

29. Folding top frame for a motor vehicle comprising, arranged on each side:
   a front frame part,
   a center frame part which is adjustable by a four-membered joint,
   a rear frame part which forms a lever,
   a first guide being hinged to the center frame part and the front frame part,
   a second guide being hinged to the front frame part and a third guide, and
   the third guide being hinged to the rear frame part and to the first guide,
   wherein the front frame part is adjustable relative to the center frame part by the first, second and third guides, with the first and second guides being swivelled about corresponding swivel joints in succession around corresponding motor vehicle cross axes.

30. A method of making a folding top for a motor vehicle with a folding top frame
   providing on each side of the vehicle:
      a front frame part,
      a center frame part being adjustable by a four-membered joint, and
      a rear frame part forming a lever
   hinging with respective swivel joints:
      a first guide to each said center frame part and to said front frame part,
      a second guide to each front frame part and to a respective third guide, and
      a respective third guide to each said rear frame part and to the first guide,
      wherein the front frame part is adjustable relative to the center frame part by the first, second and third guides, with the first and second guides being swivelled about corresponding swivel joints in succession around corresponding motor vehicle cross axes.

* * * * *